R. PFUND.
WIRELESS DUPLEX SYSTEM.
APPLICATION FILED JUNE 4, 1910.

1,076,312.

Patented Oct. 21, 1913.

2 SHEETS—SHEET 1.

WITNESSES:

INVENTOR
Richard Pfund
BY
his ATTORNEYS

R. PFUND.
WIRELESS DUPLEX SYSTEM.
APPLICATION FILED JUNE 4, 1910.
1,076,312.
Patented Oct. 21, 1913.
2 SHEETS—SHEET 2.
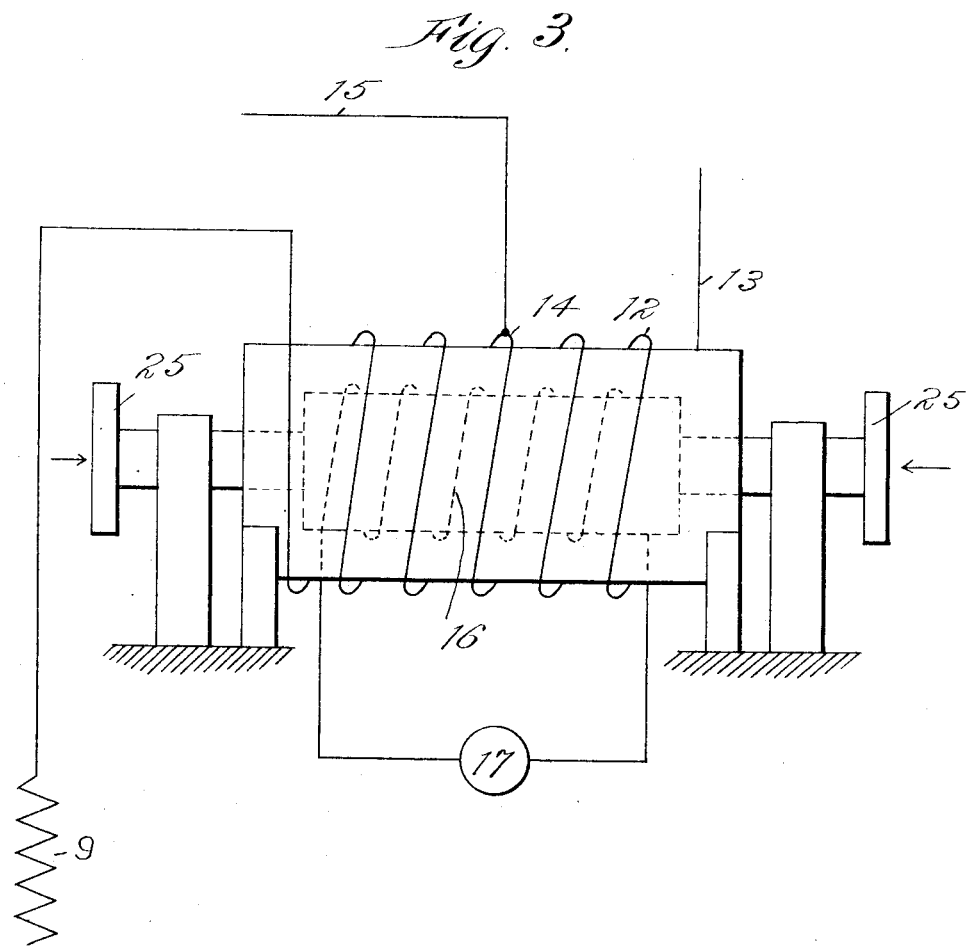

UNITED STATES PATENT OFFICE.

RICHARD PFUND, OF NEW YORK, N. Y.

WIRELESS DUPLEX SYSTEM.

1,076,312.  Specification of Letters Patent.  Patented Oct. 21, 1913.

Application filed June 4, 1910. Serial No. 565,042.

*To all whom it may concern:*

Be it known that I, RICHARD PFUND, a citizen of the United States, and a resident of the city, county, and State of New York, have invented a new and useful Improvement in Electric Wave Signaling Consisting in a Wireless Duplex System.

My invention relates generally to wireless telegraphy and telephony and particularly to a means for providing a system for simultaneously transmitting and receiving wireless signals without mutual interference or in other words a duplex system.

The essential features of this duplex system are a receiver circuit associated with an aerial and ground circuit or so-called open oscillation circuit, a special variable or fixed oscillation circuit designed for use as an artificial aerial and ground circuit, an auxiliary coil equally divided between the actual aerial and ground oscillation circuit and the special variable or fixed artificial oscillation circuit and a variable or fixed exciting oscillation circuit *i. e.* an oscillation circuit in which the oscillations employed in transmitting are produced, all so arranged that no effect is produced in the receiver circuit by the oscillations originating in the exciting circuit and employed for transmitting but only by the oscillations created in the actual aerial and ground oscillation circuit by incoming waves.

My invention may be best understood by reference to the accompanying drawings forming part of this specification which illustrate certain circuits for applying this system but inasmuch as a wide range is permissible in the application of my invention without departing from the principle thereof it is understood that my invention is not limited to the particular circuits shown herewith.

In the accompanying drawings only the high-frequency circuits are shown the other circuits ordinarily associated therewith being omitted for the sake of clearness.

Figure 1:
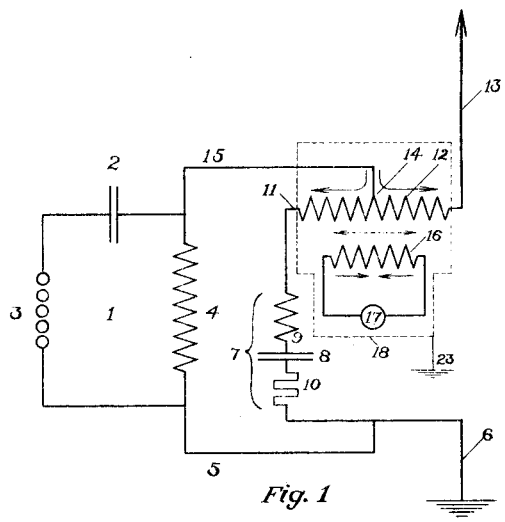
Figure 2:
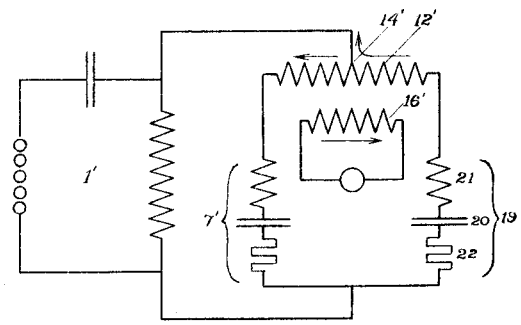

In said drawings Figure 1 diagrammatically represents the high frequency circuits with the aerial-ground circuit 13—6 shown in conventional manner. Fig. 2 represents the same diagram as shown in Fig. 1 but with an oscillation circuit 19 substituted for the aerial-ground circuit 13—6 shown in Fig. 1, for better explanation. Fig. 3 is a detail illustration of the balance coil, showing how it may be adjusted.

In Fig. 1 these high frequency circuits of my duplex system consist of the usual closed variable or fixed exciting oscillation circuit 1 in which the oscillations employed in transmitting are produced by the discharge of a condenser 2 through a spark-gap or gaps 3, and a variable or fixed inductance coil 4. One terminal 5 of this variable or fixed inductance coil 4, is connected to ground or its equivalent at 6 and also to one side of a special variable or fixed oscillation circuit 7 containing capacity 8, inductance 9 and resistance 10, one or two, or all of which may be variable for purposes of adjustment. This special variable or fixed oscillation circuit 7 I prefer to call the artificial oscillation circuit. The other side of this special variable or fixed artificial oscillation circuit 7 is connected at 11 to one side of a coil 12 and to the other side of this coil 12 is connected the aerial 13. The exact center 14 of the coil 12 is connected to the remaining terminal 15 of the variable or fixed inductance coil 4. It will now be obvious that with proper adjustment of the special variable or fixed artificial oscillation circuit 7 with reference to the aerial-ground or so-called open oscillation or radiating circuit 13—6, a balance may be obtained in the coil 12 due to equal and opposite currents flowing at some instant during transmission in the coil 12 either to or from the point 14 and that these equal and opposite currents will in turn tend to induce equal and opposite currents in the receiving coil 16 inductively coupled with the coil 12 and therefore have no effect upon the indicating apparatus 17 included in the circuit of the coil 16, provided that this receiving coil 16 is also so situated with reference to the coil 12, that the exact electrical center of coil 16 coincides with the exact electrical center of the coil 12, so that the substantially equal and opposing fields produced by the substantially equal and opposite currents flowing in the coil 12 from the point 14 will tend to produce substantially equal and opposite effects in the coil 16. In order to obtain the exact balance I propose to make the coil 16 movable along the axis of the coil 12, as indicated by the dotted arrows between the coil 12 and the coil 16 of Fig. 1 and as shown in Fig. 3 where coil 16 is shown having handles 25 at either end, by which it can be axially shifted within coil 12. I also inclose both the coil 12 and the coil 16 in a conducting case or cage as indicated by the dotted line 18 in Fig. 1 in order to screen and protect the balanced coils or circuits 12 and 16 from extraneous inductive influence from other portions of the transmitter. This conducting case or cage may be grounded, as indicated at 23 in Fig. 1. In order to still further explain the principle and operation of my duplex system I have substituted for the actual aerial ground oscillation circuit 13—6 of Fig. 1, the oscillation circuit shown at 19, in Fig. 2 which circuit contains the capacity 20, the inductance 21 and the resistance 22, together representing the electrical equivalent of the aerial-ground oscillation circuit 13—6 of Fig. 1. With exact balance between the two oscillation circuits 7' and 19 of Fig. 2, respectively representing the variable or fixed artificial oscillation circuit 7, and the aerial-ground oscillation circuit 13—6 of Fig. 1, it will now be obvious that although no effect will be produced in the coil 16' by oscillating currents originating in the exciting circuit 1' and flowing in opposite directions through the coil 12' from the point 14', this will not be the case if such oscillating currents originate in the circuit 19 of Fig. 2, the electrical equivalent of the aerial-ground oscillation circuit 13—6 of Fig. 1, because in the latter case these currents originating in the circuit 19 flow through the coil 12' in but one direction at any instant instead of entering the coil 12' at the center 14' and flowing in opposite directions from said center.

The full line arrows in Fig. 1 represent the direction at some instant and the path of the sending currents in the coil 12 and the induced currents in the coil 16 originating in the exciting circuit 1 while the full line arrows in Fig. 2 represent the direction at some instant and the path of the receiving currents originating in the circuit 19, or the electrical equivalent aerial-ground circuit 13—6 of Fig. 1.

Having described my invention, I claim:

1. A system for the simultaneous transmission and reception, without mutual interference, of signals or speech by means of electromagnetic waves comprising an aerial-ground radiating circuit, an artificial non-radiating balancing circuit, an auxiliary coil in series with both the aerial-ground radiating circuit and the artificial non-radiating balancing circuit, a transmitting exciting circuit with one side connected to ground and the other side connected to the center of the auxiliary coil, a movable coil forming part of a receiving circuit in inductive relation to the auxiliary coil and both the entire receiver and the auxiliary coil contained in a grounded metallic screening case or cage.

2. A duplex system for the simultaneous transmission from and reception at one and the same station, and without mutual interference, of signals or speech by means of electromagnetic waves comprising an aerial-ground radiating circuit, an artificial non-radiating balancing circuit, an auxiliary coil in series with both the aerial-ground radiating circuit and the artificial non-radiating balancing circuit, a transmitter exciting circuit with one side connected to ground and the other side connected to the center of the auxiliary coil, a movable coil forming part of a receiving circuit in inductive relation to the auxiliary coil and both the entire receiver and the auxiliary coil screened from the rest of the aerial-ground radiating circuit, the artificial non-radiating balancing circuit and the transmitting exciting circuit.

RICHARD PFUND.

Witnesses:
H. ALFRED JANKE,
OCTAVIUS KNIGHT.